United States Patent [19]

Taschner et al.

[11] Patent Number: 4,604,896
[45] Date of Patent: Aug. 12, 1986

[54] ROTOR BLADE TEST APPARATUS

[75] Inventors: Edwin C. Taschner, Scottsdale, Ariz.; Edward M. Myzska, San Antonio, Tex.

[73] Assignee: The United States of America as represented by the Secretary of the Air Force, Washington, D.C.

[21] Appl. No.: 737,377

[22] Filed: May 24, 1985

[51] Int. Cl.⁴ .................... G01H 3/08; G01H 13/00
[52] U.S. Cl. ............................... 73/583; 73/584
[58] Field of Search ............... 73/579, 583, 584, 659

[56] References Cited

U.S. PATENT DOCUMENTS

| 2,876,638 | 3/1959 | Diamond | 73/579 |
| 3,097,523 | 7/1963 | Diamond et al. | 73/584 |
| 3,580,056 | 5/1971 | Warner | 73/579 |
| 3,623,358 | 11/1971 | Sugimoto | 73/579 |
| 4,342,229 | 8/1982 | Massa | 73/583 |
| 4,358,882 | 11/1982 | Wilkinson | 73/583 |
| 4,389,891 | 6/1983 | Fournier | 73/579 |

Primary Examiner—Stewart J. Levy
Assistant Examiner—John E. Chapman, Jr.
Attorney, Agent, or Firm—Donald J. Singer; William Stepanishen

[57] ABSTRACT

A rotor blade test apparatus having a striking solenoid to strike a rotor blade to generate an audio signal. A microphone receives the audio signal and applies it to a spectrum analyzer wherein the predominant natural frequencies of the rotor blade are determined.

7 Claims, 2 Drawing Figures

ROTOR BLADE TEST APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an engine test apparatus, and in particular to a rotor blade test apparatus.

In a jet engine, the rotating blades of the inducer rotor undergo excititations in a very wide range of frequencies. Because of this, the blades may go into resonance, and the amplitude of oscillation may reach destructive values. Knowing the exact value of these resonance frequencies in the various modes make it possible to minimize the harmful effects by applying appropriate remedies.

In the prior art, various techniques to excite a rigid member by means of a sound generator have been utilized. The blade's resonance is in general detected at its tip by means of a displacement transducer which is therein mounted. This transducer furnishes the frequency and amplitude of the blade's resonance. The maximum is sought by varying the frequency of the excitation signal and by correlatively measuring its amplitude in the displacement pick-up. The disadvantages in the use of such methods are the relative slowness and the resulting poor precision. Indeed, in the vicinity of the resonance frequency, the amplitude curve varies very little, and finding the maximum proves to be a delicate procedure if good precision is desired.

In general, a rigid member will ring when struck on its surface. The resulting sound wave has a characteristic or natural frequency for the specimen, and diminishes progressively in amplitude with time, the rate of diminishing with time being also characteristic of the rigid member. The characteristic resonant frequency and the damping factor vary observably with variations in the material and structural condition of the rigid member. This principle is known, and has been utilized in nondestructive examination of rigid members. For example, a rigid member that has been tapped on the surface, may be examined acoustically by ear to determine the contents and structural condition. For instance, this method has been applied to examine the degree of bond between a bearing metal and its linings, or for the existence of blowholes in the castings. However, this method is only useable by those who have been specially trained to hear such effects, and the resulting data is not always reliable by reason of individual variability.

SUMMARY OF THE INVENTION

The present invention utilizes an electromagnetically activated solenoid to strike the rotor blade of a jet engine to produce a natural resonant frequency in the blade. An audio microphone is utilized to pick up the natural resonant frequency and is applied to a frequency analyzer for analysis and comparison with typical rotor blade responses.

It is one object of the present invention, therefore, to provide an improved rotor blade test apparatus.

It is another object of the invention to provide an improved rotor blade test apparatus to identify gross cracks in rotor blades that are otherwise undetectable in the installed engine.

It is another object of the invention to provide an improved rotor blade test apparatus to identify nonconforming rotor blades in terms of blade geometry.

It is another object of the invention to provide an improved rotor blade test apparatus to determine rotor blade mean frequency and to make statistical comparisons to the fleet population.

It is another object of the invention to provide an improved rotor blade test apparatus by which rotor blades with a limited remaining service life may be identified and replaced prior to an in-flight failure.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
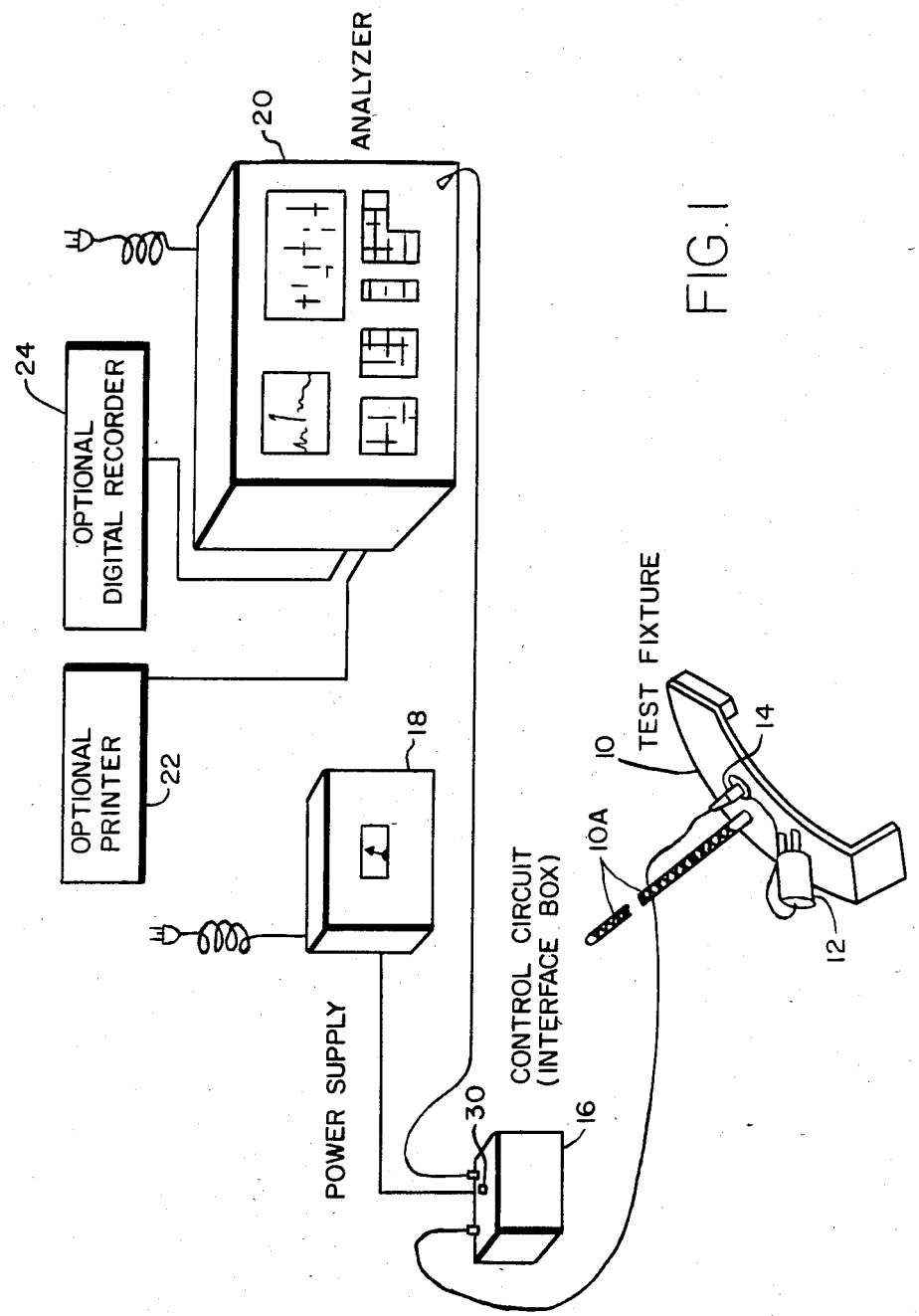
FIG. 1 is a block diagram of the rotor blade test apparatus according to the present invention, and, FIG. 2 is a block diagram of the interface control unit.

Referring now to FIG. 1, there is shown a rotor blade test apparatus for testing the rotor blades of a jet engine while the engine is installed in the aircraft. A rotor blade test fixture 10 is configured to span or cradle the rotor blades on either side of the rotor blade to be tested. A handle 10a is provided to facilitate the positioning and maintaining the rotor blade test fixture 10 over the rotor blade under test. A striking solenoid 12 is mounted on the rotor blade test fixture 10 at a predetermined distance from the rotor blade (not shown). The striking solenoid 12 is utilized to apply a single blow to the rotor blade under test thereby causing the rotor blade to resonate at its natural frequency. The striking solenoid may be any type of suitable solenoid that is commercially available. A microphone unit 14 is mounted on the test fixture 10 such that it can pick up the natural frequency signal that was induced in the rotor blade. The microphone unit 14 may also be any type of convenient size microphone that is commercially available.

The electrical power and signal requirements for the elements mounted on the test fixture 10 are provided by the interface control unit 16 by means of an electrical cable connected therebetween. The interface control unit 16 provides +28 volts DC which is needed to actuate the solenoid unit 12. A power supply unit 18 which operates on standard commerical power (120 volt, 60 cycles) provides the +28 volts DC to the interface control unit 16. Since the microphone unit 14 requires approximately +5 volts DC for operation, the interface control unit 16 includes a standard commercially available +5 volt DC voltage regulator. The input voltage to the regulator unit is +28 volts DC and the output voltage is +5 volts DC. The interface control unit 16 also includes a pushbutton switch 30 or some other type of similar switch that is normally open to operate a trigger timing circuit which actuates the striking solenoid 12. The response signal which is picked up by the microphone 14 is applied through the interface control unit 16 to the spectrum analyzer unit 20. The spectrum analyzer unit may be any suitable commercially available analyzer unit such as the SD345 FFT Signal Analyzer. In the event that a more permanent type record of the frequency response is needed, an optional printer unit 22 or digital recorder unit 24 may be utilized in conjunction with the spectrum analyzer unit 20.

Figure 2:
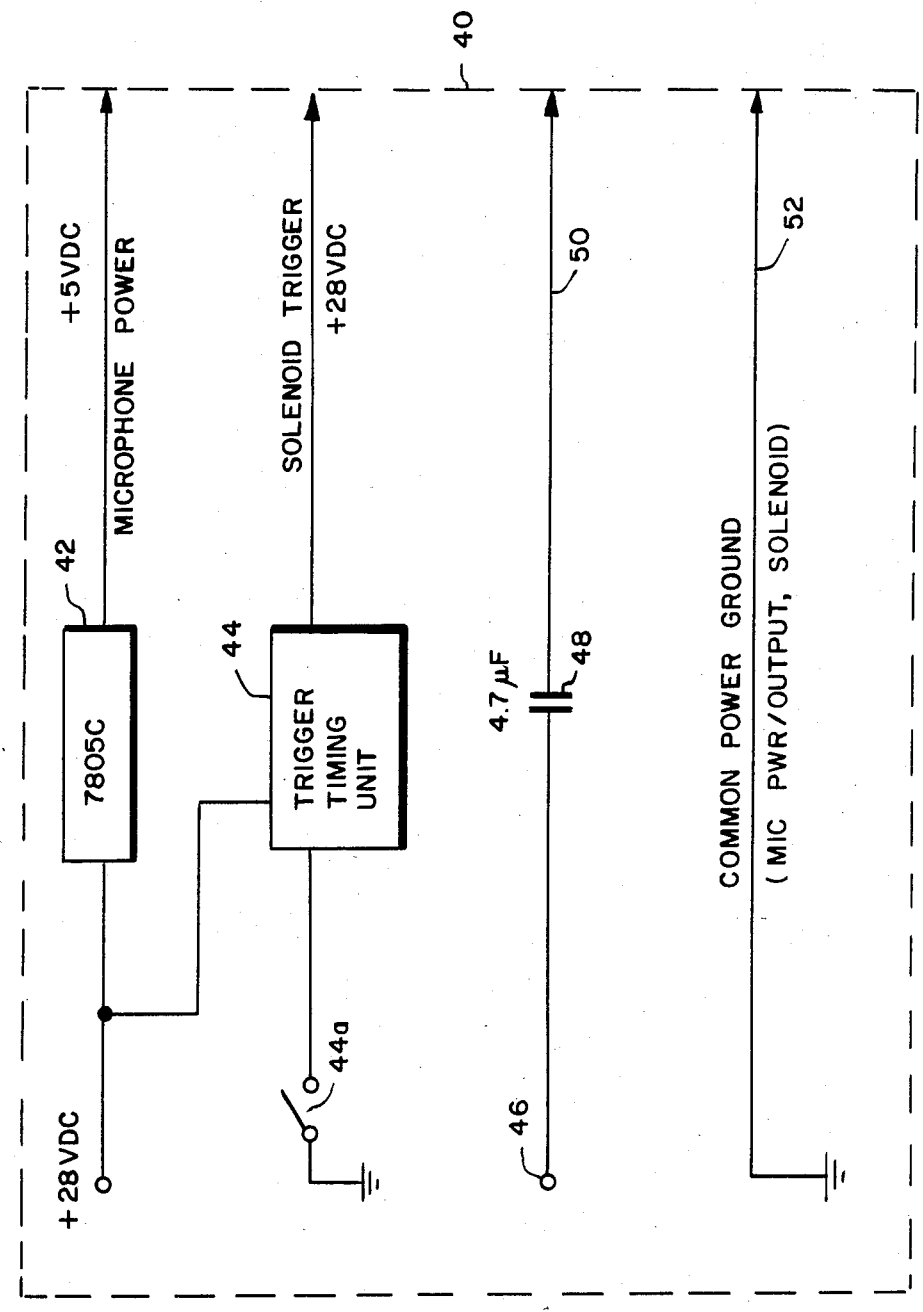

Referring now to FIG. 2, there is shown a detailed block diagram of the interface control unit 40. A +28 volt DC power supply voltage is applied to the +5 volt DC regulator unit 42 and the trigger timing unit 44. The output signal from the voltage regulator unit 42 is a +5 volt DC signal that is utilized to power the microphone unit in the test fixture of FIG. 1. The trigger timing unit 44 which receive the +28 volt DC voltage also, is activated by switch unit 44a to provide a +28 volt DC solenoid trigger output signal. The solenoid trigger signal pulses the solenoid in FIG. 1 to provide a single blow to the rotor blade to establish the blade resonant frequency response. The output signal from the microphone in FIG. 1 is applied to input terminal 46 wherein it is coupled by a 4.7 μf capacitor 48 to output terminal 50 which is attached by a cable (in FIG. 1) to the spectrum analyzer unit. A common ground line 52 is provided to maintain a common reference ground between the interface control unit 40 and the test fixture of FIG. 1 with respect to the microphone output signal and power, and the solenoid power return.

The following brief description will describe the objective and manner of operation of the present invention. The rotor blade test apparatus provides the means by which a maintenance technician can evaluate the condition of the first compressor component (inducer rotor) in the J-69 engine or similar such engine without removing the engine from the aircraft. The rotor blade test apparatus utilizes a fixture that rests on the inducer rotor blade. A 36" handle enables the technician to insert the fixture through the aircraft intake and place it on a rotor blade to be tested. A dolly is utilized to hold the frequency analyzer and the control box. The objective of the present invention is to measure the natural frequency of each inducer rotor blade by striking it; using a microphone to pick up the natural ring and feeding the signal to a frequency analyzer that determines the predominant (natural fundamental) frequency. The data is recorded by engine serial number and blade location and processed to determine conformance to predetermined frequency parameters, determine rotor mean frequency, and make statistical comparisons to the fleet population. The following procedure sets forth the general steps of the testing operation:

(1) index rotor with blue dycom
(2) insert fixture down the intake of aircraft until it engages the inducer. Fixture is designed to cradle blades adjacent to blade being tested.
(3) Trigger striking solenoid using switch on control box. Analyzer will record natural frequency.
(4) Repeat test for each of sixteen blades. Test takes approximately 2 to 3 minutes per engine.

This test identifies gross cracks otherwise undetectable in the installed engine and identifies non-conforming blades in terms of geometry. Training can be accomplished in less that 1 hour and the test yields consistently repeatable results at that level of training.

Although the invention has been described with reference to a particular embodiment, it will be understood to those skilled in the art that the invention is capable of a variety of alternative embodiments within the spirit and scope of the appended claims.

What is claimed is:

1. A rotor blade test apparatus for the J-69 engine comprising in combination:
   a test fixture for cradling a plurality of rotor blades including the rotor blade to be tested,
   a solenoid means for striking said rotor blade, said striking solenoid means mounted on said test fixture at a predetermined distance from said rotor blade, said solenoid striking being actuated to strike said rotor blade to produce an audio signal,
   means for receiving audio signals, said audio receiving means mounted on said test fixture to receive said audio signal,
   an interface control means for providing operating voltages to said striking solenoid and said audio receiving means, said interface control means including a means for activating said striking solenoid, and a means for signal coupling, and,
   a means for frequency analyzing an audio signal, said frequency analysing means operatively connected to said interface control means, said frequency analyzer means receiving said audio signal from said audio receiving means from said signal coupling means in said interface control means, said frequency analyzing means analyzing said audio signal and providing a frequency waveform which is representative of said audio signal.

2. A rotor blade test apparatus as described in claim 1 further including a handle attached to said test fixture to facilitate the positioning of said test fixture on said rotor blade to be tested.

3. A rotor blade test apparatus as described in claim 2 wherein said audio receiving means comprises a microphone.

4. A rotor blade test apparatus as described in claim 2 wherein said activating means comprises a means for manually closing a switch and trigger timing unit.

5. A rotor blade test apparatus as described in claim 2 wherein said signal coupling means comprises a capacitor.

6. A rotor blade test apparatus as described in claim 2 wherein said frequency analyzing means comprises a spectrum analyzer.

7. A rotor blade test apparatus as described in claim 5 wherein said capacitor has a value of 4.7 microfarad.

* * * * *